Figures 1, 2:
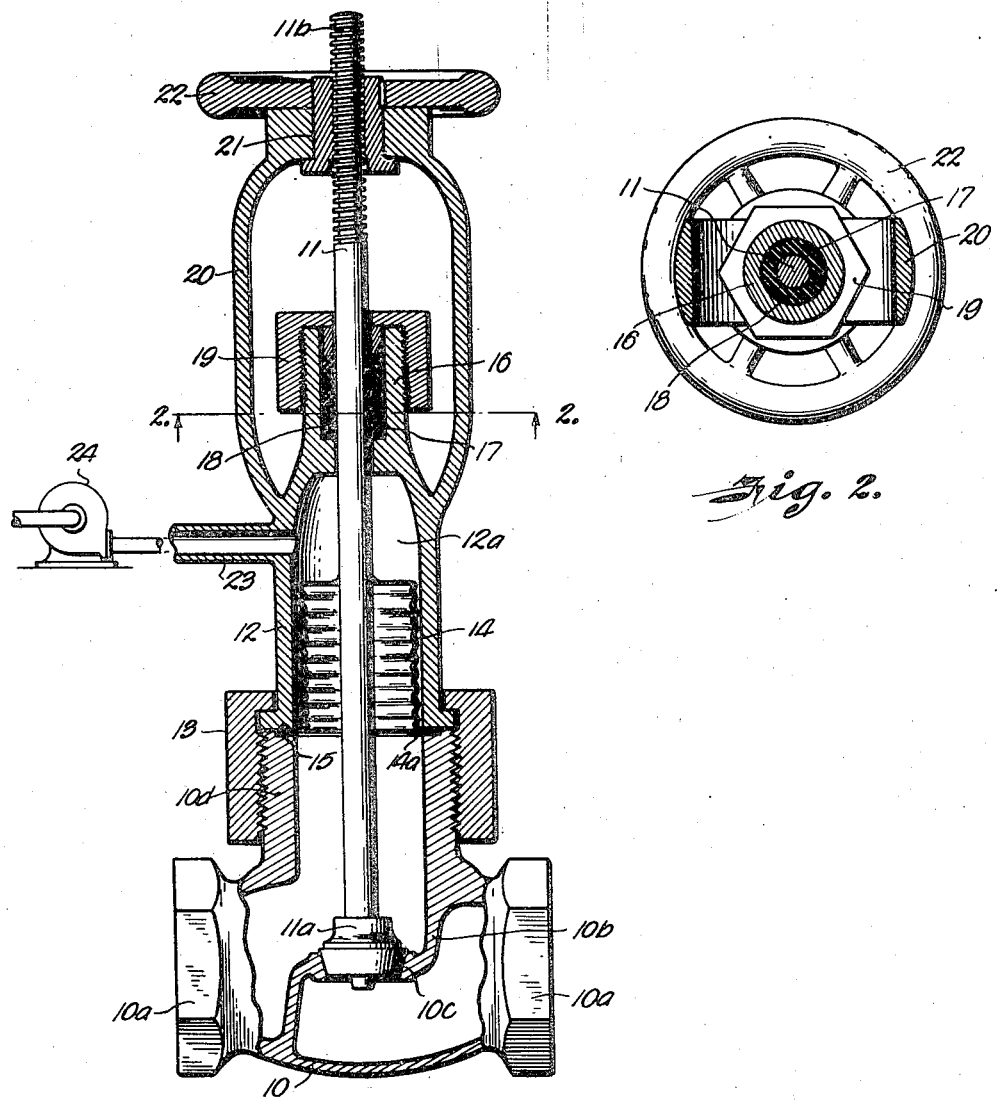

July 6, 1948.  H. R. JONES  2,444,703
VALVE ASSEMBLY
Filed May 22, 1944  2 Sheets-Sheet 1

INVENTOR.
Harry Roswell Jones
BY
ATTORNEY.

July 6, 1948.  H. R. JONES  2,444,703
VALVE ASSEMBLY
Filed May 22, 1944  2 Sheets-Sheet 2

INVENTOR.
Harry Roswell Jones
BY
ATTORNEY.

UNITED STATES PATENT OFFICE 2,444,703

VALVE ASSEMBLY

Harry Roswell Jones, Ponca City, Okla., assignor to Continental Oil Company, Ponca City, Okla., a corporation of Delaware Application May 22, 1944, Serial No. 536,709

7 Claims. (Cl. 251—31)

My invention relates broadly to new and useful improvements in valves and more particularly to improvements in packing gland assemblies for use on valves handling corrosive fluids at high pressures and temperatures.

Ordinary valves cannot be used for highly corrosive fluids such as anhydrous hydrogen fluoride because these fluids rapidly corrode the conventional valve packings. When this occurs, fluid escaping around the valve stem represents a loss of fluid and creates a dangerous and unhealthful condition. If, in addition, the fluid is at a high or extremely low temperature the packing is even less efficient.

Several types of valves have been developed to handle corrosive fluids but they have been generally unsatisfactory.

In one valve the conventional packing gland is replaced by a metal bellows having sufficient mechanical strength to withstand the internal pressure of the system. However, when the bellows is made sufficiently strong to withstand high line pressures it is so inflexible that its vertical travel is unduly restricted. Consequently, these assemblies can only be used with quick opening valves.

In another type of valve, oil from a remote or extraneous source is pumped continuously into the packing around the valve stem. The pressure on the oil is maintained slightly higher than the line pressure so that there is a constant leakage of sealing oil into the system which prevents the corrosive fluids from coming into contact with the packing material. However, this valve uses considerable quantities of oil and the infiltrating oil is an impurity in the line fluid.

In still another type of valve, designed to operate under extremely high or extremely low temperature conditions, the bonnet is provided with radiating fins to dissipate heat to or absorb heat from the atmosphere. Such a design is bulky and close regulation of the temperature at the packing gland is impossible.

I have developed a packing gland that is preeminently satisfactory for use on valves handling a corrosive fluid at high pressures and under either high or low temperature conditions. In my packing gland the line fluid is retained by a lightweight highly flexible bellows sealed to the valve body and valve stem. The bellows is easily operated against high line pressures by enclosing it in a housing and maintaining an inert fluid such as oil under pressure in the housing. Sufficient pressure is imposed on the housing fluid so that only a slight pressure differential exists across the bellows. This structure can be adapted to either quick or slow opening valves and there is no leakage of fluid from the housing. The low pressure differential permits easy manipulation of the valve.

In view of the above, it is obvious that the primary object of my invention is to provide a valve gland assembly that can be used on valves handling corrosive fluids at high pressures and under extreme temperature conditions.

Another object of my invention is to provide a valve of the above-mentioned character that can be adapted to any of the conventional type valves.

Another object of my invention is to provide a valve packing assembly that can be used on a valve handling fluids under conditions of extremely high or low temperatures regardless of whether the fluid is corrosive to ordinary packing materials.

Still another object of my invention is to provide a valve packing assembly that can be easily manipulated regardless of the fluid pressure in the pipe line.

Yet another object of my invention is to provide a valve packing assembly that does not permit contaminants to enter the line fluid.

Other objects and advantages of my invention will be apparent during the course of the following description.

Figure 3:
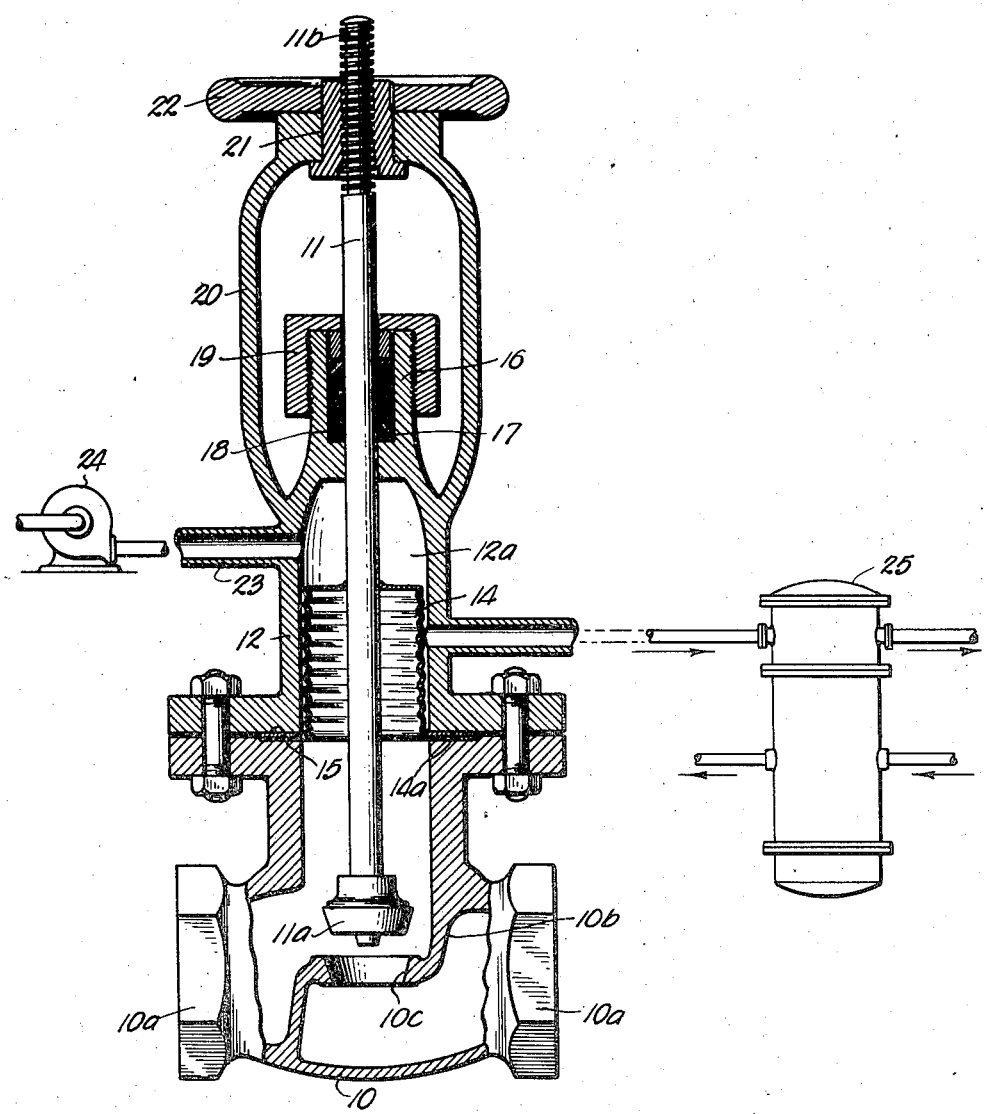

In the drawing forming a part of this specification and wherein like numerals are employed to designate like parts throughout the same, Fig. 1 is a vertical sectional view of a packing gland assembly embodying my invention and showing the same associated with a conventional globe valve, Fig. 2 is a transverse sectional view taken on the line 2—2 of Fig. 1, and Fig. 3 is a vertical sectional view of a packing gland assembly embodying my invention and showing the same associated with a valve adapted to handle fluids at extremely high or low temperatures.

In the drawing, wherein for the purpose of illustration is shown a preferred embodiment of my invention, the numeral 10 designates a conventional valve body having pipe ends 10a and an internal partition 10b formed with a fluid port 10c. A disc 11a carried by valve stem 11 is manipulated to open or close port 10c. The valve body is also formed with an upstanding externally threaded collar 10d through which the valve stem passes. The above structure represents a typical globe valve and is not a part of the present invention.

My invention is particularly concerned with the valve packing assembly which surmounts the valve body. The lower open end of housing 12 is firmly held against the edge of collar 10d by nut 13. The internal chamber 12a of the housing is partitioned from the valve body by a lightweight flexible bellows 14. The open lower end of the bellows is formed with an outwardly extending radial flange 14a which is clamped between the lower end of the housing 12 and collar 10d. A suitable soft metal gasket 15 assures a fluid tight joint between the housing and the valve body and prevents intermingling of the fluids in the body and housing. Valve stem 11 extends centrally through the housing 12 and bellows 14, the latter fastened thereto by fusion welding, silver soldering or other suitable means providing a fluid tight seal.

At its upper end housing 12 is formed with a bonnet 16 which provides a stuffing box 17 around valve stem 11. Packing material 18 is compressed in the stuffing box 17 in the conventional manner by a stuffing nut 19.

The upper end of housing 12 is also formed with a yoke 20 which supports the threaded upper end 11b of valve stem 11. A bushing 21 threaded on the valve stem and carried by yoke 20 is rotated by handwheel 22 to axially move the stem. Manipulation of the handwheel in this manner raises and lowers disc 11a to open and close the valve.

As suggested, the fluid pressure within valve body 10 is frequently extremely high. As best shown in Fig. 1, this fluid has free access to the interior of bellows 14. In order that lightweight bellows 14 withstand the high pressure from below, I fill the chamber 12a with a suitable non-corrosive fluid such as a bland sealing oil. The oil enters chamber 12a through pipe 23. A suitable means such as pump 24 is provided to maintain the oil under a pressure approximating that existing in the valve body. By regulating the fluid pressure in chamber 12a a slight pressure differential can be maintained across bellows 14 regardless of the pressure of the line fluid. Thus, bellows 14 will operate as satisfactorily under very high pressures as it will under low pressures. The fluid in chamber 12a is noncorrosive and the conventional packing material 18 will effectively seal the joint around valve stem 11. However, since bellows 14 is exposed to the corrosive fluid in valve body 10 it should be made of noncorrosive material. The bellows may desirably be made from the same metal as the valve body.

While I have here shown the valve packing assembly associated with a globe valve, it is to be understood that it may be mounted on a gate valve, a needle valve, a diaphragm-operated motor valve or any other conventional valve type. The assembly will operate as well on slow opening valves as on quick opening ones. Since the pressure differential across the bellows may be maintained as low as desired the bellows may be formed of very light gauge material. When the bellows is constructed of lightweight material its vertical travel may be greatly increased. The low pressure differential also permits easy manipulation of the valve regardless of the line pressure.

In order to utilize this valve packing assembly under extremely high or extremely low temperature conditions the pipe 23a is added to the housing 12. A suitable heating or cooling means such as heat exchanger 25 is provided to remove heat from the oil in the case of valves operating at elevated temperatures or to add heat to the oil in the case of valves operating at reduced temperatures. Under these conditions pump 24 maintains the oil in chamber 12a under a pressure approximating that existing in the valve body and also circulates it through heat exchanger 25 to remove or impart heat. By regulating the rate at which the oil is circulated the temperature of the packing gland may be maintained at any predetermined value. By regulating the fluid pressure in chamber 12a a slight pressure differential can be maintained across bellows 14 regardless of the pressure of the line fluid as previously described. Thus, bellows 14 operates as satisfactorily under very high pressures as under low pressures. Similarly, stuffing box assembly 16—19 operates as satisfactorily at very high or very low temperatures as at standard or room temperatures.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. A valve assembly comprising a valve body, closure means in said body, a housing surmounting the valve body, an axially movable valve stem extending through the housing and into the valve body operatively connected to the closure means, means for actuating the valve stem, a sealing gland having relative movable and frictional engagement with said stem and effecting a fluid tight joint between the stem and the housing, a bellows relatively inert to fluids traversing the valve having one end rigidly secured to partition the valve body and housing and with the other end fixedly secured to said valve stem, and means for admitting relatively noncorrosive fluid under pressure into the housing above said bellows.

2. A valve assembly comprising a valve body, closure means in said body, a housing surmounting the valve body, an axially movable valve stem extending through the housing and into the valve body operatively connected to the closure means, means for actuating the valve stem, a sealing gland having relative movable and frictional engagement with said stem and effecting a fluid tight joint between the stem and the housing, a bellows relatively inert to fluids traversing the valve having one end rigidly secured to partition the valve body and housing and with the other end fixedly secured to said valve stem, and means for admitting a relatively noncorrosive fluid in the housing above the bellows at a pressure approximately equal to the pressure of the fluid traversing the valve body.

3. A valve assembly comprising a valve body, closure means in said body, a housing surmounting the valve body, an axially movable valve stem extending through the housing and into the valve body operatively connected to the closure means, means for actuating the valve stem, a sealing gland having relative movable and frictional engagement with said stem and effecting a fluid tight joint between the stem and the housing, a bellows relatively inert to fluids traversing the valve having its open end clamped between the housing and the valve body and its closed end surrounding and fixedly secured to the valve stem whereby to prevent fluid in the valve body from entering the housing, means for admitting fluid into the housing above the bellows, and means for maintaining a slight fluid pressure differential across the bellows.

4. A conventional valve body of the type adapted to handle corrosive fluids at high pressures and provided with closure means and an axially movable stem operatively associated with the closure means, having in combination therewith a packing gland assembly comprising a housing surmounting the valve body so that the valve stem extends longitudinally therethrough, a bellows surrounding the stem and connected thereto partitioning the housing from the valve body, the bellows movable with the valve stem and preventing fluid in the body from passing into the housing, a packing sealing the joint between the housing and the stem, and means for admitting a relatively noncorrosive fluid under pressure into the housing above the bellows.

5. A conventional valve body of the type adapted to handle corrosive fluids at high pressures and provided with closure means and an axially movable stem operatively associated with the closure means, having in combination therewith a packing gland assembly comprising a housing surmounting the valve body so that the valve stem extends longitudinally therethrough, a bellows surrounding the stem and connected thereto partitioning the housing from the valve body, the bellows movable with the valve stem and preventing fluid in the body from passing into the housing, packing sealing the joint between the housing and the stem, and means for maintaining a relatively noncorrosive fluid in the housing above the bellows at a pressure approximately equal to the pressure of the fluid traversing the valve body.

6. A valve assembly comprising a valve body, closure means in said body, a housing surmounting the valve body, an axially movable valve stem extending through the housing and into the valve body operatively connected to the closure means, means for actuating the valve stem, a sealing gland effecting a fluid tight joint between the stem and the housing, a bellows relatively inert to fluids traversing the valve having its open end clamped between the housing and the valve body and its closed end surrounding and connected to the valve stem whereby to prevent fluid in the valve body from entering the housing, and means for circulating fluid through the housing above the bellows.

7. A valve assembly comprising a valve body, closure means in said body, a housing surmounting the valve body, an axially movable valve stem extending through the housing and into the valve body operatively connected to the closure means, means for actuating the valve stem, a sealing gland affecting a fluid tight joint between the stem and the housing, a bellows relatively inert to fluids traversing the valve having its open end clamped between the housing and the valve body and its closed end surrounding and connected to the valve stem whereby to prevent fluid in the valve body from entering the housing, means for admitting fluid into the housing above the bellows, means for maintaining a slight fluid pressure differential across the bellows, means for circulating the fluid through the housing above the bellows, and means for maintaining a desired temperature of the circulating fluid.

HARRY ROSWELL JONES.

REFERENCES CITED

The following references are of record in the file of this patent:

UNITED STATES PATENTS

| Number | Name | Date |
|---|---|---|
| 354,936 | Rohn | Dec. 28, 1886 |
| 1,572,922 | Govers | Feb. 16, 1926 |
| 1,740,924 | Kellogg | Dec. 24, 1929 |
| 1,906,313 | Clifford | May 2, 1933 |
| 2,102,797 | Helmer | Dec. 21, 1937 |
| 2,252,029 | Pieper | Aug. 12, 1941 |

FOREIGN PATENTS

| Number | Country | Date |
|---|---|---|
| 528,814 | Great Britain | 1929 |